July 19, 1932.  N. M. MARSILIUS ET AL  1,868,016
MILLING MACHINE
Original Filed Nov. 30, 1927  2 Sheets-Sheet 2

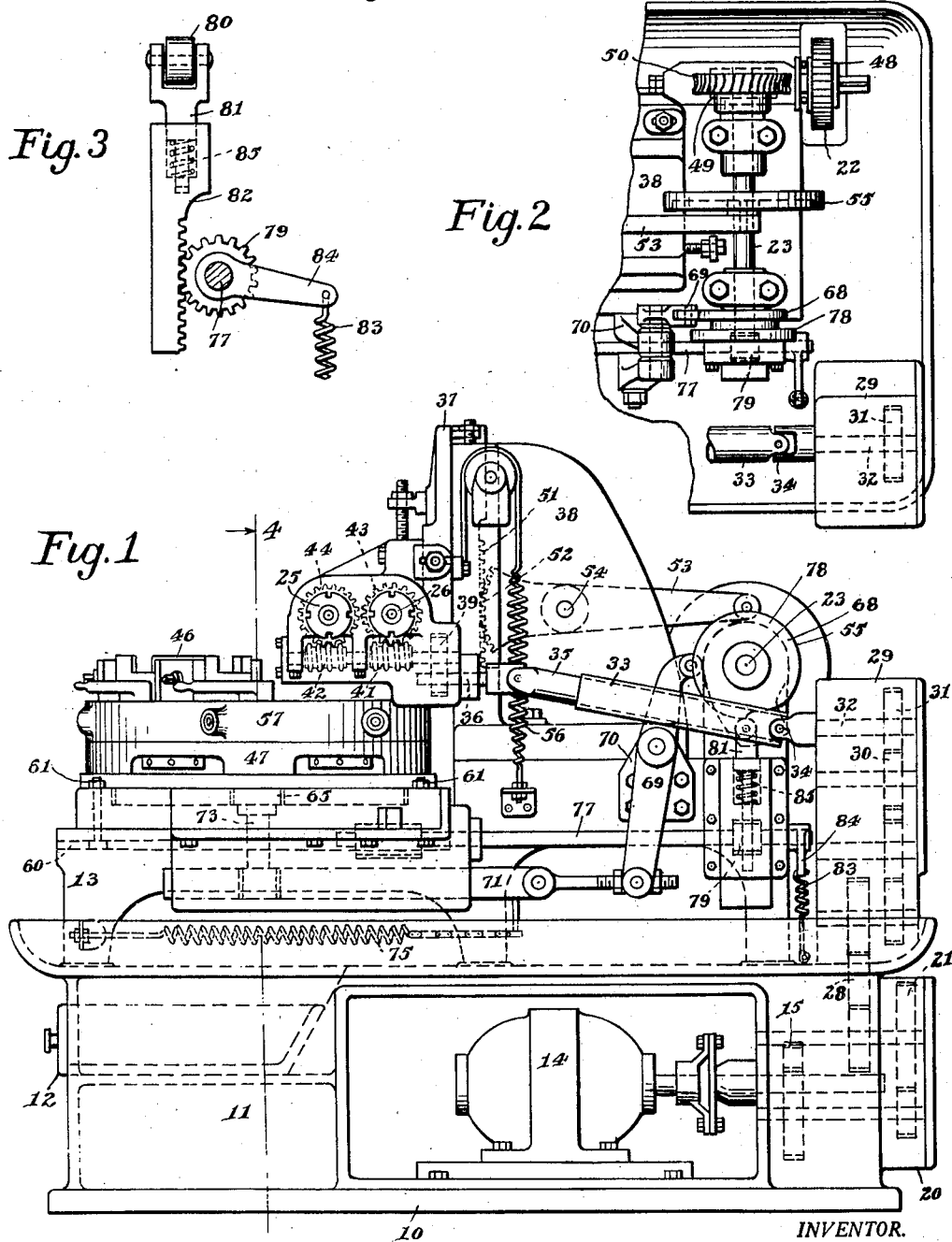

INVENTOR.
Newman M. Marsilius
and Oswald A. Olsen
BY THEIR ATTORNEY
Christian M. Newman Patented July 19, 1932

1,868,016

UNITED STATES PATENT OFFICE

NEWMAN M. MARSILIUS, OF BRIDGEPORT, AND OSWALD A. OLSEN, OF STRATFORD, CONNECTICUT, ASSIGNORS TO THE PRODUCTO MACHINE COMPANY, OF BRIDGEPORT, CONNECTICUT, A CORPORATION OF CONNECTICUT

MILLING MACHINE

Original application filed November 30, 1927, Serial No. 236,647. Divided and this application filed July 9, 1931. Serial No. 549,648.

Our present invention relates to improvements in combined indexing and locking means for milling and other types of machines, such for instance as a Pro-Ducto-Matic shown and described in my co-pending application filed November 30, 1927, Serial No. 236,647, now Patent No. 1,860,840, May 31, 1932, and of which this forms a divisional application.

The machine referred to is adapted to accommodate different types of turrets and fixtures and is capable of performing different kinds of milling operations such as squaring, hexing, octagon, straddle-milling, as are particularly illustrated and described in the beforementioned co-pending application, and therefore need not be gone into in detail with respect to such features as are claimed in the said co-pending application. In this connection, it will be also understood that while the present invention is shown and described as applied to a specific type of machine forming a part of another application, yet it is to be understood that the invention is equally applicable to other forms of machines requiring a turret and mechanism for indexing and locking the same.

Additional objects and advantages will become apparent from the consideration of the following detailed description taken in connection with the accompanying drawings forming a part of this specification. It is to be understood, however, that the description and drawings are by way of illustration only and that changes in certain features of construction, combination and arrangement of parts may be resorted to without departing from the spirit of the invention or the scope of the accompanying claims to which reference must be had for definition of the limitations of the invention.

Like reference characters will be found to denote like or corresponding parts throughout the several figures of the accompanying drawings, in which Fig. 1 shows a side elevation of an improved type of milling machine including a rotatable turret operated by my novel indexing mechanism;

Fig. 2 shows a fragmentary plan view of the rear portion of the machine shown in Fig. 1, to better illustrate the cam shaft, and its worm and gear drive;

Fig. 3 is a detail elevational view of cam engaging means for operating the rack bar and turret locking bolt shown in Figs. 1 and 5;

Referring in detail to the characters of reference marked upon the drawings, 10 indicates a base comprising a casting of suitable height having in its forward portion a chamber 11 to receive a basket or drawer 12 for catching chips. A bed 13 is mounted on this base and together they serve to carry all the operative parts of the machine. A motor 14 arranged centrally of the base provides the necessary power for the operation of the machine and this power is distributed through suitable gearing arranged for the most part in the rear of the base.

Figure 4:
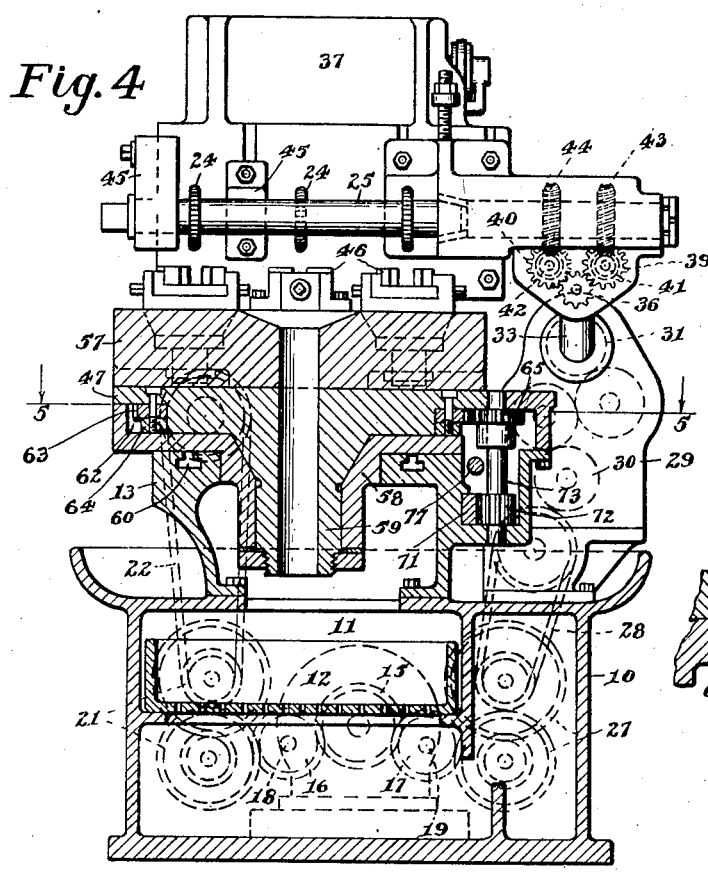
Fig. 4 is a vertical cross-sectional view taken on line 4—4 of Fig. 1, looking in the direction of the arrows.
Figure 6:
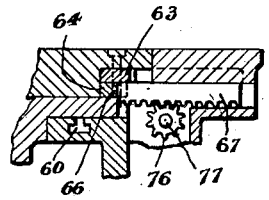
Fig. 6 shows an enlarged detail, cross-sectional view taken on line 6—6 of Fig. 5.
Figure 5:
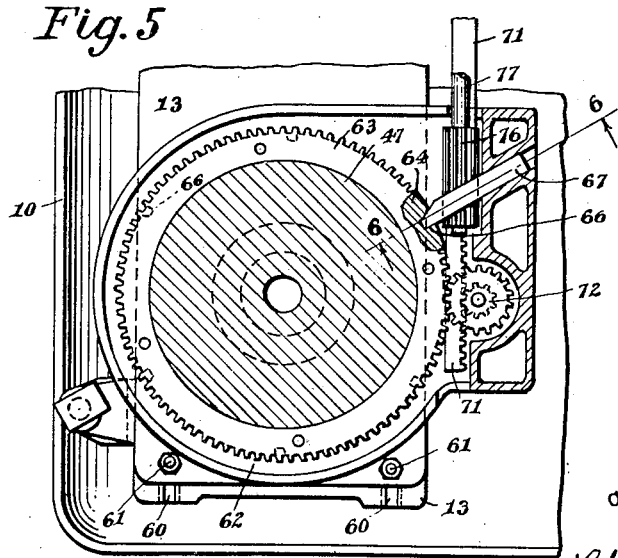
Fig. 5 is a sectional plan view showing the means for indexing and locking the turret, taken on line 5—5 of Fig. 4.

As is clearly shown in Figs. 1 and 4, the motor shaft carries a gear 15 meshing with and driving gears 16 and 17 arranged at opposite sides of the motor shaft, on shafts 18 and 19 having suitable bearings in gear casing 20. Power is transmitted to a cam shaft through gear 16, a gear train 21 including chain belt 22 to operate a cam shaft 23.

The milling cutters 24 are operated by power taken from the motor shaft through gear 17. These cutters are mounted on shafts 25 and 26 driven from the motor shaft through gear 17, gear train 27 and chain belt 28. Within a casing 29 mounted on the base 10 is gearing 30 whereby the direction of rotation of the cutters may be reversed. Of this means, gear 31 is mounted on and drives a shaft 32 connected to operate a tubular shaft 33 through a universal joint 34. This tubular shaft is slidably mounted on a splined shaft 35 connected to a short shaft 36 journaled in a bearing of the cutter slide 37 mounted for vertical reciprocatory movements on an upright 38 secured to the top of the bed 13. The short shaft 36 carries a gear which meshes with and drives gears 39 and 40 mounted upon worm shafts carrying worms 41 and 42 which in turn drive worm gears 43 and 44 on driving shafts that are aligned with and for driving the cutter shafts 25 and 26.

Tapered socket connections are provided intermediate the ends of the aligned shafts and cutter shafts 25 and 26 for driving the latter. The said cutter shafts are journaled in brackets, 45, as shown, and each shaft serves to carry one or more cutters 24 for operating upon work, not shown, when supported in the several work holders 46 mounted on the turret 47. The drive for the cam shaft 23 which indexes and locks the turret 47 and operates the vertically reciprocatory cutter slide 37, is operated through gear 16 as before explained and includes a gear 48, a worm 49 and worm gear 50 on said cam shaft 23, see Fig. 2. The rear of the cutter slide 37 carries a rack 51 which is engaged by a toothed segment 52 of a lever 53 pivotally mounted as at 54 between the reinforcing ribs of the before mentioned upright 38. The rear end of the lever carries a roller to engage cam 55 carried by the cam shaft 23 which acts to rock the lever and reciprocate the slide against the action of a spring 56.

The turret 47 includes a mounting plate 57 and is rotatably mounted in a bearing member 58 adjustably fixed to the bed 10 of the machine. The turret further includes a hollow spindle 59 that is fitted to rotate in the annular bearings of the bearing member. The table 13 is provided with T-slots 60 to receive bolts 61 whereby the bearing member is secured, in its adjusted positions, to the bed. Intermediate the annular edge portion of the turret and the bearing member is formed an annular pocket 62, and secured to the underside of the turret within this pocket are a pair of rings 63 and 64 the former of which is provided with gear teeth in engagement with a gear 65 adapted to be driven, as will be described, for rotating the turret to index the same. The ring 64 is provided with spaced notches 66 to be successively entered by a bolt 67 for locking the turret against movement at each station during milling operations. Here it may be stated that while six work holders and six notches have been shown, this number may be either increased or decreased as occasion requires, depending upon the work to be performed.

Figure 7:
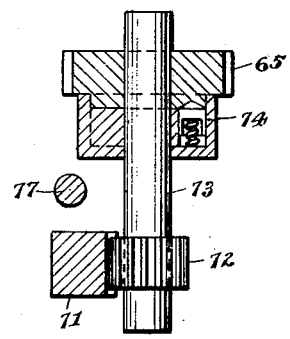
Fig. 7 is an enlarged detailed sectional elevation showing gears and clutch forming part of the indexing mechanism.

Cam 68 on shaft 23 acts to rock a lever 69 pivotally mounted on bracket 70 carried by table 13, to reciprocate a rack bar 71, the teeth of which mesh with a pinion 72 on a shaft 73 which also mounts beforementioned gear 65 through means of a clutch 74, see Fig. 7. This clutch transmits power to gear 65 only on the rearward stroke of rack bar 71, this being the motion imparted to said bar by the cam 68. A coil spring 75 imparts forward motion to the bar 71 and serves to maintain the upper roller carrying end of lever 69 in engagement with the cam 68. Lever 69 is connected to the threaded end of bar 71 whereby adjustment may be made for indexing a turret having more or less stations than that shown.

Movement is imparted to the lock bolt 67 through a gear 76 that engages a toothed rack on the underside of the bolt. The gear 76 is mounted on shaft 77 which is given a partial rotary movement by cam 78 through a gear 79 also carried by the shaft. Action of the cam 78 is transmitted to gear 71 through roller 80 mounted in a yoke 81 that is yieldably mounted in a rack bar 82, see Fig. 3. A spring 83 connected to a lever 84 and secured to rocker shaft 77 serves to maintain roller 80 in engagement with cam 78 and to return the parts to their normal position and withdraw bolt 67 at the proper time to permit of further indexing movement of the turret, to bring the work to the next work station, there being a yieldable spring connection 85 as between the yoke 81 and the rack 82 so as to insure engagement of the lock bolt 67 with the face of the ring 64, and to cause it to snap into the notches the instant they present themselves in alignment with said bolt.

Having thus described our invention, what we claim and desire to secure by Letters Patent is:

1. In a milling machine, a turret, means for indexing the turret, locking means for the turret including a bolt carrying rack teeth, to engage the turret, a shaft, a pinion on said shaft engaging said rack teeth, a second pinion on the shaft spaced from the first pinion, a rack engaging said second pinion, a cam for moving said rack to rotate the shaft to move the bolt and lock the turret.

2. In a milling machine, a turret, means for indexing the turret, locking means for the turret including a bolt carrying rack teeth, to engage the turret, a shaft, a pinion on said shaft engaging said rack teeth, a second pinion on the shaft spaced from the first pinion, a rack engaging said second pinion, a cam for moving said rack to rotate the shaft to move the bolt and lock the turret, and means to rotate the shaft in the opposite direction to move the bolt and release the turret.

3. In a milling machine, a turret including an annular gear, a pinion to engage the gear, a shaft for the pinion carrying a second pinion, a reciprocatory rack engaging said second pinion, a cam shaft and cam, and connections therefrom with the reciprocatory rack for indexing the turret, locking means for said turret including a bolt having a rack, a rocker shaft, a pinion on said rocker shaft engaging said rack teeth, a cam upon the cam shaft and connections therefrom to the rocker shaft for operating the same and lock the bolt.

4. In a milling machine, a turret including an annular peripheral surface having a series of notches therein, locking means for the turret including a bolt to engage the turret and carrying rack teeth, a rocker shaft, an elongated pinion on said rocker shaft engaging said rack teeth, a second pinion on the rocker shaft spaced from the first pinion, a rack engaging said second pinion, a cam for moving said rack to rotate the shaft to move the bolt to lock the turret.

5. In a milling machine, a turret including an annular peripheral surface having a series of notches therein, locking means for the turret including a bolt carrying rack teeth, to engage the turret, a rocker shaft, an elongated pinion on said rocker shaft engaging said rack teeth, a second pinion on the rocker shaft spaced from the first pinion, a rack engaging said second pinion, a cam for moving said rack to rotate the shaft to move the bolt to lock the turret, and yielding means intermediate said cam and bolt to insure a yieldably engagement of said bolt with the face of the turret and to cause the bolt to snap into the notches of the turret when in registration therewith.

Signed at Bridgeport, in the county of Fairfield and State of Connecticut, this 7th day of June, A. D. 1931.

NEWMAN M. MARSILIUS.
OSWALD A. OLSEN.